US005681447A

United States Patent [19]
Maycock et al.

[11] Patent Number: 5,681,447
[45] Date of Patent: Oct. 28, 1997

[54] REMOVAL OF TRACE METAL AND METALLOID SPECIES FROM BRINE

[75] Inventors: Kenneth R. Maycock, White Rock; Judith G. Ulan, Richmond; Christen R. Moser, Surrey, all of Canada

[73] Assignee: Chemetics International Company Ltd., Vancouver, Canada

[21] Appl. No.: 636,979

[22] Filed: Apr. 24, 1996

[51] Int. Cl.$^6$ .................. C25B 1/16; C25B 1/26
[52] U.S. Cl. .................. 205/536; 423/179; 423/184; 423/185
[58] Field of Search .................. 205/536; 423/179, 423/184, 185

[56] References Cited

U.S. PATENT DOCUMENTS

| | | | |
|---|---|---|---|
| 4,176,022 | 11/1979 | Darlington | 205/536 |
| 4,207,152 | 6/1980 | Kadija et al. | 205/536 |
| 4,274,929 | 6/1981 | Novak | 205/536 |

OTHER PUBLICATIONS

Hunt, "Charcoal adsorbent is effective on heavy metals" Mar. 1992, pp. 21–22.

"A Brief Background to Brimac Natural Charcoal", Information Brochure provided by G.D. Irvine, Tate & Lyle Industries Ltd., 21 Dellingburn Street, Greenoch, PA 15 4YP, Scotland no date.

Kavanagh et al: Investigation of Absorbers provided by Tate & Lyle Process Technology to Test Their Efficiency for the Removal of Radionuclides from Aqueous Waste Streams no date.

Welsh et al: "An Ultrafiltration Activated Carbon Treatment System for renovating Fishery Refrigeration Brines", J. Can. Inst. Food Sci. Technology (1984), 17, #2, pp. 92–96 no date.

Singer: "Activated Carbon for the Removal of Trace Metals from Aqueous Solutions", Ion Exchange For Pollution Control, Chapter 21, p. 195, vol. 2, 1979 no date.

Wan et al: "Research and Development Activities for the Recovery of Gold from Noncyanide Solutions" no date.

Zhiying et al: "Determination of Trace Lead by on–line FIA Hydroxyapatite Ion–Exchange Preconcentration AAS", Ion Exchange And Absorption, 9 (6), 1993, p. 504 no month.

*Primary Examiner*—Arun S. Phasge
*Attorney, Agent, or Firm*—Cushman Darby & Cushman IP Group Pillsbury Madison & Sutro LLP

[57] ABSTRACT

Process for the removal of heavy metal, metalloid and fluoride species present in trace mounts from aqueous brine of use in the production of chlorine and sodium hydroxide by electrolysis in membrane cells or in chlorate production; particularly to said removal by adsorption on hydroxyapatite; and more particularly to adsorption on bone charcoal.

15 Claims, No Drawings

REMOVAL OF TRACE METAL AND METALLOID SPECIES FROM BRINE

This application claims the benefit of U.S. Provisional Application No. 60/001,284, filed Jul. 21, 1995.

FIELD OF THE INVENTION

This invention relates to the removal of metals present in trace amounts from brine of use in the production of chlorine and sodium hydroxide by electrolysis in membrane cells, particularly to said removal by adsorption on hydroxyapatite and more particularly to adsorption on bone charcoal.

BACKGROUND TO THE INVENTION

Brine is used in the production of chlorine and sodium hydroxide in the membrane electrolytic cell. Should the levels of certain metals, notably aluminum, exceed even 100 ppb (parts per billion) damage to the membrane can result. Nickel presents an even greater problem wherein concentrations below 20 ppb are required. Further Pb, Mn, As and Fe must all meet stringent specifications of below 100 ppb. Brine treatment is optionally practiced wherein caustic and carbonate addition to brine solutions is carried out to induce precipitation of, inter alia, calcium, magnesium and iron carbonates or hydroxides. Additionally, this treatment produces insoluble hydroxides of other metals to provide a somewhat lower metal concentration. Generally, ion exchange processes are then carried out to reduce calcium and magnesium levels even further, i.e. to less than 30 ppb. However, as the caustic brine is re-circulated in the chloralkali process, trace metals eventually become concentrated to those levels which are likely to cause damage to the membrane. At present, to avoid this metal concentration build-up, the recycled brine is periodically purged. However, it is most desirable to have a method, other than purging, to limit the trace metal concentration and particularly to have a way of removing trace metals from concentrated brine.

The need for high purity water in a number of applications involving removal of trace metals from aqueous solutions is well-known in the art. Strong base/strong acid ion-exchange substances which remove both cations and anions to release $H^+$ and $OH^-$ have been available for many years for water de-ionization. Unfortunately, because these ion-exchangers are non-specific, they are generally unacceptable in brine solutions where removal of sodium chloride to any significant degree is not desired.

Ion selective ion-exchangers have been developed for brine system for the removal of calcium and magnesium from caustic brine. However, under normal operating conditions these ion-exchangers are ineffective for the satisfactory removal of other metals in trace mounts from brine.

Chelating resins are known to selectively adsorb mercury in aqueous solutions but the literature is silent as to the efficacy of such resins in brine. Resins incorporating 8-hydroxyquinoline and related compounds as chelating resins for metal ion recovery are known in the metal-finishing industry. However, the performance of these resins in concentrated brine solutions has not been reported.

It is known that methods of trace metal removal optimized for one system do not necessarily function to the desired degree in another system. The difference between a dilute aqueous salt solution and concentrated brine can drastically affect the trace metal removal ability of an adsorbent material. One significant potentially and generally unknown complication relates to the competition for adsorption sites in the absorbent in a large excess of sodium ion. Even if sodium ion is only weakly adsorbed, as compared to the trace metal to be removed, the realtively high concentration of the sodium ion can effectively suppress significant metal removal. Modified starches, such as for example, water-insoluble sodium tertiary amine sulphonate starches have been shown to effectively remove trace metals from dilute aqueous solutions, but the presence of even 1.0 molar sodium chloride drastically inhibits metal adsorption by these materials. Furthermore, a process which successfully reduces trace metals to a level of a few ppm (parts per million) does not, in many circumstances provide the necessary removal to the ppb level. Precipitation as metal hydroxides, sulphates, carbonates or sulfides are examples of this phenomena. Solubility limits of the order of hundreds of ppbs make this precipitation process unacceptable when very high purity streams are required. Electro-chemical methods which consist of essentially plating the metal out on a cathode are limited by transport effects and become uneconomical when treating very dilute solutions.

Bone charcoal is composed principally of carbon and hydroxyapatite $[Ca_{10}(PO_4)_6(OH)_2]$—the latter being the inorganic constituent of natural bone. The carbon content of the bone charcoal is derived from the complete carbonization of the naturally occurring organic content of bone and is approximately 10 percent by weight of the bone charcoal product. The process operates at temperatures up to 1000° C. and carbonization time is around twelve hours. The total surface area of the bone charcoal is approx. 100 m²/g. of which around 50% is attributable to the carbon content.

Bone charcoal has been used as an adsorbent in the food industry, particularly in the refining of sugar for over one hundred years, and in water filtration for reducing levels of heavy metals, chlorine, bromine and fluoride and organo-chloro pesticides. However there is no reported work on trace metals removal by bone charcoal or hydroxyapatite in concentrated salt solutions. The effect of high salt concentrations is an unknown quantity. Further selective reduction in concentration of metal species is also an unknown quantity.

Hydroxyapatite is known to remove trace metals such as Ni, Zn, Cu, Co, Cd and Pd from aqueous solution—H. Zhiying et at. "Ion Exchange Adsorption", 9(6), 504, (1993).

Activated carbon has also been used to remove trace metals from non-brine aqueous solutions, reported in "ACTIVATED CARBON FOR THE REMOVAL OF TRACE METALS FROM AQUEOUS SOLUTIONS", P. C. Singer Ion Exchange for Pollution Control, C. Calmon and H. Gold eds. Chapter 21 pg. 195 vol 2, 1979; and "RESEARCH AND DEVELOPMENT ACTIVITIES FOR THE RECOVERY OF GOLD FROM NONCYANIDE SOLUTIONS", R. Y. Wan and M. Le Vier, Hydrometall. Proc. Milton E. Wadsworth Int. Sym., 4th, pg. 415–36, 1993.

Activated carbon has been used for brine treatment. In one application the activated carbon is used to remove organic impurities in solutions used to store fish. It was found from mineral composition results obtained for this investigation that Fe, Zn, Cr, Ni, Pb and Mn levels actually increased in concentration while Cu and B concentrations decreased slightly, reported in "An Ultrafiltration Activated Carbon System for Renovating Fishery Refrigerated Brines", Welsh and Zall, Aeon. Ind. Food Sci. Technology, HJ. vol. 17, no. 2, pp. 092–096, 1984. We found no reports of activated carbon effectively reducing metals concentration in brines and this study indicates that at least one form of activated carbon is ineffective for trace metals removal from brine.

However, while there is a significant need, the prior art does not disclose or teach processes for the removal of metals present in trace mounts in brine solutions to provide metal concentrations acceptable to membrane chloralkali cells.

SUMMARY OF THE INVENTION

It is an object of the present invention to provide a brine solution for use in membrane chloralkali cells having acceptable low trace metal concentrations.

It is a further object of the present invention to provide a method of producing said brine solutions having low trace metal concentrations.

Accordingly, in one aspect the invention provides a method for lowering the concentration of heavy metal, metalloid and fluoride species present in trace amounts in a strong brine, said method comprising treating said brine with an effective said species-adsorbing amount of transition metal phosphate adsorber to produce a resultant brine having reduced concentrations of said species and removing said resultant brine.

The hydroxyapatite may comprise adsorbed alkaline metal and/or alkali earth cations.

By the term "strong brine" is meant aqueous solutions containing at least 50 g/l NaCl.

The method is of value at neutral pH—pH 14, but is of particular value at pH 8–12 and more particularly at pH 9–11.

Preferably, the hydroxyapatite is a bone charcoal and most preferably Brimac 216™ bone charcoal.

The trace metal-containing brine may be treated with a hydroxyapatite in either a batch process or a continuous elution process.

Suprisingly, we have discovered that a sodium chloride aqueous solution containing at least 50 g/l NaCl is of value in the practice of the invention in that it allows significant and beneficial reduction of trace metal concentrations. Further, the process of the invention is of particular value with much stronger brine solutions, for example, 150–250 g/l sodium chloride liquors for membrane chloralkali cells and more beneficial with 300 g/l sodium chloride feedstock for said cells. Such purified brine solutions are also of value as feedstock in electrolytic cells for the production of sodium chlorate.

In a further aspect the invention provides for the removal of trace metals from strong brine by use of transition metal phosphate adsorbers. Examples of such adsorbers are zirconium phosphate, titanium phosphate and cerium phosphate.

The invention thus, surprisingly, provides a method to successfully decrease the level of trace metals such as, for example, lead, arsenic, iron, cadmium, silver, aluminium, gold, mercury, copper, strontium, zinc, cobalt, vanadium and chromium and metalloid species such as $SiO_2$, in concentrated brine to well-below the specifications necessary for use in the membrane chloralkali process. In addition to being able to reduce aluminum levels to below 100 ppb and nickel below detection limits of 10 ppb, the preferred bone charcoal adsorbent of use in the invention has very favourable high loading capacity and can treat relatively large volumes of brine before being replaced with fresh adsorbent.

In a further aspect, the invention provides a method of producing chlorine and sodium hydroxide in a membrane electrolytic cell comprising feeding a brine feedstock to said cell to produce said chlorine, said sodium hydroxide and a depleted brine the improvement comprising treating said depleted brine with an hydroxyapatite as hereinabove defined.

Hydroxyapatite is also known as hydroxylapatite, apatite, calcium phosphate hydroxide and calcium phosphate tribasic and can be obtained in pure form (no carbon) from many chemical suppliers. The synthetic form exists as a fine powder as opposed to the natural bone which can be suitably crushed to any desired particle size.

A most preferred bone charcoal of use in the process of the invention is Brimac 216 bone charcoal (Tate & Lyle Ltd., U.K.). Brimac 216, unlike activated carbons which are single element materials, is a complex natural charcoal comprising a matrix of calcium hydroxyapatite covered by a coating of carbon. Although the actual volume of carbon in the product is only about 9%, compared with about 75% calcium hydroxyapatite, the former accounts for about 50% of the total surface area—which is large at 100 $m^2$/g.

DETAILED DESCRIPTION OF A PREFERRED EMBODIMENT

In order that the invention may be better understood a preferred embodiment will now be described by way of example only.

Experiments were conducted to determine the capacity of Brimac 216 for trace metals in brine. Three standard solutions were prepared with the following compositions.

A: 10 ppm NaCl: 10 ppm Al: 10 ppm Pb: 10 ppm Mn;

B: 30 000 ppm NaCl: 10 ppm Al: 10 ppm Pb: 10 ppm Mn: 10 ppm Ni;

C: 300 000 ppm NaCl: 10 ppm Al: 10 ppm Pb: 10 ppm Mn: 10 ppm Ni;

To each of the above standard solutions (100 ml) was added Brimac 216 (1.5 g) and the solutions maintained with occasional stirring at ambient temperature for 70 hours. The solutions were then analyzed by ICP and the results summarized as follows:

| Solution | Na | Al | Pb | Mn | Ni | Ca | P |
|---|---|---|---|---|---|---|---|
| | (ppm) | (ppm) | (ppm) | (ppm) | (ppm) | (ppm) | (ppm) |
| A-pH 6.5 | 10.8 | 9.9 | 9.2 | 10.0 | 0.0 | 0.0 | 0.0 |
| A-Brimac | 38.0 | 1.4 | 0.3 | 0.6 | 0.0 | 1.6 | 0.4 |
| | (mg) | (mg) | (mg) | (mg) | (mg) | (mg) | (mg) |
| mg ads per 1.5 g Brimac 216 | −2.72 | 0.85 | 0.89 | 0.94 | 0.00 | −.16 | −.04 |
| | (ppm) | (ppm) | (ppm) | (ppm) | (ppm) | (ppm) | (ppm) |

-continued

| Solution | Na | Al | Pb | Mn | Ni | Ca | P |
|---|---|---|---|---|---|---|---|
| B-pH 6.5 | 8980 | 8.7 | 10.2 | 8.6 | 9.5 | 0.0 | 0.0 |
| B-Brimac | 8740 | 0.0 | 0.3 | 1.5 | 0.1 | 2.3 | 0.2 |
|  | (mg) | (mg) | (mg) | (mg) | (mg) | (mg) | (mg) |
| mg ads per 1.5 g Brimac 216 | — | 0.87 | 0.97 | 0.71 | 0.94 | −0.23 | −0.02 |
|  | (ppm) | (ppm) | (ppm) | (ppm) | (ppm) | (ppm) | (ppm) |
| C-pH 6.5 | 25000 | 7.8 | 8.4 | 6.4 | 6.7 | 0.6 | 0.1 |
| C-Brimac | 23600 | 0.2 | 2.8 | 2.0 | 1.0 | 4.8 | 0.4 |
|  | (mg) | (mg) | (mg) | (mg) | (mg) | (mg) | (mg) |
| mg ads per 1.5 g Brimac 216 | — | 0.76 | 0.52 | 0.44 | 0.57 | −0.42 | −0.03 |

Results

These experiments were purposely designed to provide larger amounts of metal ions in the aqueous solutions than the Brimac 216 could adsorb and to determine selectivity and loading limits.

The sodium levels in solutions B and C were too high to be measured accurately with ICP. It is seen that in solution A Brimac 216 releases sodium into solution.

In all three solutions, the Al level was drastically reduced and, in the case of B and C to below the detection limits of the ICP. Increased NaCl concentrations do not inhibit the adsorption of Al.

In all three solutions, the Pb levels were reduced, although some inhibition of Pb adsorption occurs at high salt concentrations.

Mn was shown to be strongly adsorbed from solutions while there appears to be some inhibition at higher NaCl concentrations.

There was no Ni added to solution A. However solutions B and C clearly indicated reduction in Ni levels.

There was a slight increase in Ca levels, although not enough to account for the quantity of metals adsorbed. It appears sodium in addition to calcium was exchanged for the higher valent metals.

The amount of phosphorus present was below its detection limit which indicates that $PO_4^=$ contamination of brine is not a problem.

The above results clearly demonstrate the efficacy of the method of the invention. In all cases, Al, Mn, Pb and Ni concentrations were decreased when treated with Brimac 216. Even in concentrated brine, Brimac 216 selectively reduced metal species concentration. The presence of sodium did not suppress the metal removal ability of Brimac 216.

Testing of Brimac 216 for Al and Ni Removal from Brine
Column Experiments—Aluminum 250 ml of Brimac 216 (185.67 g, bulk density 0.74 g/ml) was backwashed with neutral $H_2O$ (6L). Some fines were collected (0.57 g) corresponding to a weight loss of 0.3 % w/w of material. The water was then displaced with brine (originally pH 10, 32 ppb Al, 2.4 ppm Ca). The Al levels of additional brine were adjusted to 500 ppb and this spiked brine was introduced at a rate of 170 ml/min (app. 1.5 min/bed volume). Samples were taken periodically and pH, Al levels and Ca levels were determined. For a part of the run, the flow rate was reduced to 35 ml/min (7 min/bed volume) to see if improved Al removal could be obtained.

Thirteen bed volumes of brine were passed through the column. Under these conditions Brimac 216 was able to reduce the Al levels of 500 ppb Al brine to 150 ppb (170 ml/min) and 110 ppb (35 ml/min). The experiment was conducted at ambient temperature. Pilot scale experiments were conducted to further access the performance of bone charcoal for the removal of trace metals from concentrated brine. A charge of 200 kg bone charcoal (bed depth 0.9 m) was tested. Concentrated brine: NaCl 300 g/l, pH 10–12, temperature 60°–70° C., was introduced at a rate of 1.5 $m^3$/hr for a period of 6 days. Under these conditions the alumium concentration was reduced from 90 ppb to less than 30 ppb. During the experiment there was no loss in Al removal capability.

Batch Experiments—Al (Total Capacity)

Based on data for Brimac 216 in aqueous solution (590 mg Al removed for 100 g Brimac) one would need to add over 1000 liters of 500 ppb Al brine to 185 g of Brimac 216 to determine the capacity. Instead a batch experiment was performed to determine the capacity for Al in a matrix of concentrated brine. To one (1) liter of 300 g/l NaCl was added enough $AlCl_3$ to produce a final concentration of 10 ppm Al. The pH of this solution was 11.62, the NaCl concentration was 296 g/l, the calcium ion concentration was less than 100 ppb and Al concentration was 10 ppm. To this solution was added 1 g of Brimac 216. The mixture was stirred occasionally and maintained at ambient temperature. A sample taken after 3 (three) hours had a pH of 11.35, a calcium concentration of 600 ppb, a NaCl concentration of 300 g/l and an Al concentration of 3.5 ppm. This Al level was unchanged from a sample taken after 1 hour and 24 hours and it was assumed that the mixture had reached saturation. Thus, the capacity of Brimac 216 for Al in brine is 650 mg/100 g Brimac 216, which is slightly higher than found for Al from aqueous solution. It should be noted that Brimac 216 released only about 0.1 mg of Ca for each mg of Al adsorbed.

Column Experiments—Ni 125 ml of Brimac 216 (95.85 g, bulk density 0.77 g/ml) was first backwashed with 8.5 l of neutral $H_2O$ and some fines collected (0.356 g). The water was then displaced with brine (originally pH 11.3, 22 ppb Ni, 3.1 ppm Ca). The Ni levels of additional brine were adjusted to 200 ppb and this spiked brine was introduced at a rate of 60 ml/min (app. 2.0 min/bed volume). Samples were taken periodically and the pH, Ni levels and Ca levels were determined. Thirty bed volumes of brine were passed through the column and the experiment was conducted at ambient temperature. Under these conditions Brimac 216 was able to reduce the Ni levels of 200 ppb Ni brine to less than 20 ppb (60 ml/min).

Batch Experiments—Ni (Total capacity)

To 2 L of brine (300 g/l NaCl, pH 11.3, Ca<100 ppb) was added sufficient $NiCl_2$ to produce a solution of 10 ppm Ni concentration. To 1550 ml of this solution was added 1.5 g of Brimac 216. After 1, 2 and 24 hours, samples were analyzed for pH, Ca and Ni levels. After 1 hour the Ni concentration was 4.35 ppm, the pH was 11.10 and the Ca level was 166 ppb. After 2 hours the Ni concentration was 2.15 ppm, the pH was 11.13 and the Ca concentration was 233 ppb. After 24 hours the Ni concentration was 1.7 ppm, the pH was 10.55 and the Ca concentration was 700 ppb. Based on these results the capacity of Brimac 216 for Ni in brine is 710 mg/100 g Brimac 216.

Comparative Adsorption Capacity Experiments

The adsorption capacities of bone charcoals and activated carbons with Al ion and $SiO_2$ species were determined in aqueous solution and brine as follows.

The bone charcoal and activated carbons tested are given in Table 1.

Aluminum removal

Solutions containing 8.91 ppm Al in $H_2O$ at pH 11 and 10.11 ppm Al in pH 10.5 brine (300 gpl) were prepared from aluminum chloride.

To each of 0.25 g. of adsorption material was added 250 ml. of each of the brine or aqueous solutions. The solutions were stirred at 17°–20° C. for 24 hours, after which time the Al level was determined calorimetrically. Samples were filtered to remove trace particles of bone charcoal or activated carbon. From the difference in Al concentration between the standard solution and the treated sample, the capacity defined as mg/100 g was calculated and is shown in Table 1.

The results show that At is adsorbed on both activated carbons and bone charcoals in aqueous solution. The capacities of the bone charcoals seem to be slightly higher. In brine, Al is still adsorbed by the bone charcoals but there no adsorption on the activated carbons. Rather, the negative capacity value implies that Al appears to be released to a small degree from the activated carbons.

TABLE 1

| Sample | Al conc. Initial ppm | Al conc. Final ppm | Al Capacity mg/100 g |
|---|---|---|---|
| Aqueous | | | |
| 10 ppm Al std | 8.91 | 8.91 | 0.00 |
| Brimac 216 | 8.91 | 0.81 | 810 |
| CFM bone charcoal | 8.91 | 0.61 | 830 |
| Fisher activated carbon | 8.91 | 2.81 | 610 |
| Calgon PCB activated carbon | 8.91 | 1.91 | 700 |
| Calgon CPG activated carbon | 8.91 | 1.11 | 780 |
| Brine | | | |
| 10 ppm Al std. | 10.11 | 10.11 | 0 |
| Brimac 216 | 10.11 | 6.01 | 410 |
| CFM bone charcoal | 10.11 | 8.21 | 190 |
| Fisher activated carbon | 10.11 | 10.41 | −30 |
| Calgon PCB activated carbon | 10.11 | 10.71 | −60 |
| Calgon CPG activated carbon | 10.11 | 11.31 | −120 |

$SiO_2$ Adsorption from Brine and $H_2O$

To each of 100 ml brine and $H_2O$ solutions having 10 ppm $SiO_2$, was added 200 mg of adsorber material. The solutions were shaken periodically in contact with the adsorber for six days in order to provide more contact time for adsorption. The results are shown in Table 2.

TABLE 2

| | $SiO_2$ Capacity (mg/100 g) | |
|---|---|---|
| | $H_2O$ | Brine |
| Brimac 216 Bone Charcoal | 4.9 | 88.4 |
| CFM Bone Charcoal | 46.9 | 17.9 |
| Fisher Activated Carbon | −33.5 | −27.4 |
| Calgon Activated Carbon PCB | −3.7 | −71.09 |
| Calgon Activated Carbon CPG | −64.4 | −32.56 |

It can be seen that there is a difference between the bone charcoals and the activated carbons in terms of $SiO_2$ removal. The bone charcoals definitely adsorb $SiO_2$ while the activated carbons do not. Further, it appears that the activated carbons release $SiO_2$. Yet further, it can be seen that, advantageously, Brimac 216 adsorption of $SiO_2$ is enhanced in brine.

Fluoride Removal

The following experiments were carried out to determine the efficiency of $F^-$ removal from aqueous solutions and brine using Brimac 216 bone charcoal.

Aqueous solution:

A 49.5 ppm $F^-$ solution (250 ml, pH 11) was treated with 1.0 g of Brimac 216. After stirring for 24 hours the $F^-$ concentration was 45.1 ppm. A capacity of 110 mg $F^-$/100 g Brimac 216 was thus obtained.

Brine:

Brine was spiked to 52.8 ppm $F^-$ and 250 ml was treated with 1.10 g of Brimac 216. After stirring for 24 hours the $F^-$ concentration was 41.8 ppm. A capacity of 250 mg $F^-$/100 g Brimac 216 was obtained.

Although this disclosure has described and illustrated certain preferred embodiments of the invention, it is to be understood that the invention is not restricted to these particular embodiments. Rather, the invention includes all embodiments which are functional or mechanical equivalents of the specific embodiment and features that have been described and exemplified.

We claim:

1. A method for lowering the concentration of heavy metals, metalloid and fluoride species present in trace amounts in brine having a concentration of at least 50 g/l sodium chloride, said method comprising adding to said brine a phosphate adsorber for transition metals, said adsorber being added in an amount effective to adsorb said species and produce a resultant brine having reduced concentrations of said species; and thereafter separating the resultant brine from said phosphate adsorber.

2. A method as defined in claim 1 wherein said brine has a concentration of at least 150 g/l sodium chloride.

3. A method as defined in claim 2 wherein said brine has a concentration of at least 300 g/l sodium chloride.

4. A method as defined in claim 1 wherein said transition metal adsorber is a hydroxyapatite.

5. A method as defined in claim 1 wherein said transition metal adsorber is a bone charcoal comprising a hydroxyapatite.

6. A method as defined in claim 5 wherein said bone charcoal comprises a matrix of calcium hydroxyapatite having a coating of carbon, said carbon being present in an mount selected from 5–15% V/V, and said calcium hydroxyapatite being present in an mount selected from 70–80% V/V.

7. A method as defined in claim 6 wherein said bone charcoal comprises a matrix of calcium hydroxyapatite having a coating of carbon, said carbon being present in an mount of about 9 % V/V, and said calcium hydroxyapatite being present in an mount selected from about 75 % V/V.

8. A method as defined in claim 1 wherein said metalloid species is selected from a silicon oxide and a boron oxide.

9. A method as defined in claim 1 wherein said heavy metal is selected from lead, arsenic, cadmium, silver, gold, aluminum, mercury, copper, strontium, zinc, cobalt, nickel, vanadium, manganese, chromium, palladium.

10. A method as defined in claim I wherein said heavy metal, metalloid and fluoride species concentration in said strong brine is not greater than 50 ppm.

11. A method as defined in claim 1 comprising treating said strong brine with said transition metal adsorbers in a batch in a continuous elusion treatment mode.

12. A method as defined in claim 1 comprising treating said strong brine with said transition metal adsorbers in a continuous elusion treatment mode.

13. A method as claimed in claim 1 wherein said strong brine has a pH selected from 7-14.

14. A method as claimed in claim 1 wherein said strong brine has a pH selected from 9-11.

15. An improved method of producing chlorine and sodium hydroxide in a membrane cell comprising (a) feeding a brine feedstock to said cell to produce said chlorine, said sodium hydroxide and a depleted brine solution and (b) recycling said depleted brine solution to said cell as step (a), the improvement comprising treating said depleted brine with said transition metal absorber in a process as defined in claim 1.

* * * * *